United States Patent [19]

Kregness et al.

[11] Patent Number: 4,875,180
[45] Date of Patent: Oct. 17, 1989

[54] MULTI-FUNCTION SCALER FOR NORMALIZATION OF NUMBERS

[75] Inventors: Glen R. Kregness, Minnetonka; Walter L. Quinton, White Bear Lake, both of Minn.

[73] Assignee: Unisys Corporation, Blue Bell, Pa.

[21] Appl. No.: 192,081

[22] Filed: May 9, 1988

[51] Int. Cl.⁴ .............................................. G06F 7/38
[52] U.S. Cl. .............................................. 364/715.03
[58] Field of Search .................. 364/715.03, 715.07, 364/748

[56] References Cited

U.S. PATENT DOCUMENTS

4,553,220  11/1985  Swanson ........................ 364/715.04
4,789,956  12/1988  Hildebrandt ................... 364/715.04

Primary Examiner—David M. Malzahn
Attorney, Agent, or Firm—Glenn W. Bowen; Robert S. Bramson

[57] ABSTRACT

A left justification scale factor generator is described which is capable of scaling numbers for binary number groups off one, two, three and four bit groups. Two basic building block circuits are utilized in the scale factor generator's priority encoder, which looks at four binary bits and produces a two bit binary count that corresponds to the first non-zero input found, and an algebraic priority encoder which also receives a reference signal that allows it to indicate the significance of the priority detection level. By sensing correction factors at the first level of the system, the number of logic levels are kept to a minimum.

8 Claims, 8 Drawing Sheets

Fig. 1a — LOGIC SCHEMATIC

Fig. 1b — BLOCK SYMBOL

Fig. 1c — TRUTH TABLE

Fig. 3

LOGIC SCHEMATIC
*Fig. 2a*

BLOCK SYMBOL
*Fig. 2b*

| A | B | C | D | E | P | SO | SI |
|---|---|---|---|---|---|----|----|
| L | L | L | L | L | L | L  | L  |
| L | H | X | X | X | H | H  | H  |
| L | L | H | X | X | H | H  | L  |
| L | L | L | H | X | H | L  | H  |
| L | L | L | L | H | H | L  | L  |
| H | H | H | H | H | L | L  | L  |
| H | L | X | X | X | H | H  | H  |
| H | H | L | X | X | H | H  | L  |
| H | H | H | L | X | H | L  | H  |
| H | H | H | H | L | H | L  | L  |

TRUTH TABLE
*Fig. 2c*

MULTI-FUNCTION SCALER FOR NORMALIZATION OF NUMBERS

BACKGROUND OF THE INVENTION

1. Field of the invention

This invention relates to the normalization of numbers for scale factor generation, and, in particular, to a technique that may be employed for left justification or normalization of binary, decimal or octal numbers.

2. Description of Related Art

Normalizing or scale factor generating networks have been used for many years to calculate the number of extraneous sign bits, or zero digits, in numbers for the purpose of left justifying, or normalizing, of numbers. These networks produce a count representing the shift count required to produce the required normalization. Both binary and decimal networks are commonly used for this purpose. There are occasions in which normalization to some grouping of bits other than one, two or four bit groups is required. If the grouping is other than a power of two group, then it becomes difficult to design a network to accomplish the desired function since the resulting count is usually required to be a binary count for application to a shifting network, and binary is a power of two system.

SUMMARY OF THE INVENTION

A scale factor generator is constructed which scales numbers to different binary groupings. The implemented embodiment scales numbers to groups of one, two, three and four bit groups, but other integral groups of bits may be utilized with the present invention, if desired.

BRIEF DESCRIPTION OF THE DRAWINGS

The present invention is described by reference to the drawings in which:

FIG. 1a is a schematic of a logic circuit for a priority encoder which does not require a sign bit;

FIG. 1b is a block symbol representation of the circuit of FIG. 1a;

FIG. 1c is a truth table for the circuit of FIG. 1a;

FIG. 2b is a block symbol representation of the circuit of FIG. 2a;

FIG. 2c is a truth table for the circuit of FIG. 2a; and

DESCRIPTION OF THE PREFERRED EMBODIMENT

1. General Purpose of The Invention

In order to enhance the performance of binary to binary coded decimal conversions, it is desirable to convert as many binary bits at a time as is practical. Three bits per step can be efficiently handled in a decimal adder since they can be used to multiply a decimal number by eight. This can be accomplished by left-shifting the decimal number by one digit position (four bits) which multiplies the number by ten, and then by subtracting two times the number. The resultant sum is eight times the original number. The multiplication of a binary number by eight is accomplished by merely shifting left three places. The conversion process thus consists of left shifting of the binary number three bits at a time, and adding the three bits shifted off to the decimal number which is multiplied by eight, as previously noted. Processing continues in this fashion until all the binary groups of three of the binary number are utilized.

If the size of the binary number, in terms of the number of bits to represent it, is fixed, then the conversion time is fixed by the number of three bit groups involved. It is desirable to speed up the algorithm by bypassing all of the leading sign bits or zero digits in the binary number since these bits will always convert to decimal zeroes and need not be processed in the manner described. The majority of numbers to be converted are usually much shorter than the fixed word size of the machine. The present invention strips off the leading bits in groups of three, but since this process does not involve a power of two it cannot be handled in a normal scale factoring network. One feature of this invention is to accomplish this function in a network which also produces both binary and decimal normalization counts as well.

Normalization networks may be designed in accordance with the present invention to accomplish scale factoring in one bit, three bit, and four bit groups, where only the three bit grouping is not a power of two. The described scaling network is designed to efficiently handle binary scaling and correction of the resulting count in order to provide the other scaling modes. The four bit decimal mode is accomplished by merely adding a "one" to the final binary scale count, and then forcing the least significant two bits to zeroes. The adding of "one" is required because of the difference in sign conventions between the binary and decimal formats, the binary format having a sign bit on the left of the number while certain decimal formats, for example, ASCII and EBCDIC codes, have a four bit sign digit on the right end.

The described embodiment uses a three bit scaling method to correct binary normalization to an octal scale factor count in a 1's complement numbering system. Other numbering systems may be implemented in accordance with the teachings of the present invention. Table 1 illustrates the counts generated for various cases using 24 binary input digits. The scaling counts are the number of shifts of the binary number required to remove extraneous leading sign bits or zero digits. Three methods may be postulated to accomplish this desired result.

The first involves dividing the binary count plus 1 by three, and then subtracting the remainder of the division from the original binary count plus 1. Division, however, is not an efficient method to employ in digital circuits because the process is complex and slow.

A second method that may be used to generate the equivalent remainder is to sum the odd powers of two bits of the binary scale count, subtract the summation of the even powers of two bits, and then interpret the result to form a correction factor that is subtracted from the original scale factor count. This works fine for scale factor counts of up to four bits (16 bit binary numbers), but becomes complex beyond this size. In addition, the final binary scale count must be derived before the correction factor can be calculated. Therefore, additional logic levels must be added to the scaling network, which slows down the final octal scale generation excessively.

TABLE 1

Scale Count Correction for Decimal Scaling

| INPUT BINARY NUMBER | SCALE COUNT BINARY | SCALE COUNT DECIMAL | DECIMAL CORRECTION FACTOR |
|---|---|---|---|
| 01XXXXXXXXXXXXXXXXXXXXXX | 0 | 0 | 0 |
| 001XXXXXXXXXXXXXXXXXXXXX | 1 | 0 | −1 |
| 0001XXXXXXXXXXXXXXXXXXXX | 2 | 0 | −2 |
| 00001XXXXXXXXXXXXXXXXXXX | 3 | 4 | +1 |
| 000001XXXXXXXXXXXXXXXXXX | 4 | 4 | 0 |
| 0000001XXXXXXXXXXXXXXXXX | 5 | 4 | −1 |
| 00000001XXXXXXXXXXXXXXXX | 6 | 4 | −2 |
| 000000001XXXXXXXXXXXXXXX | 7 | 8 | +1 |
| 0000000001XXXXXXXXXXXXXX | 8 | 8 | 0 |
| 00000000001XXXXXXXXXXXXX | 9 | 8 | −1 |
| 000000000001XXXXXXXXXXXX | 10 | 8 | −2 |
| 0000000000001XXXXXXXXXXX | 11 | 12 | +1 |
| 00000000000001XXXXXXXXXX | 12 | 12 | 0 |
| 000000000000001XXXXXXXXX | 13 | 12 | −1 |
| 0000000000000001XXXXXXXX | 14 | 12 | −2 |
| 00000000000000001XXXXXXX | 15 | 16 | +1 |
| 000000000000000001XXXXXX | 16 | 16 | 0 |
| 0000000000000000001XXXXX | 17 | 16 | −1 |
| 00000000000000000001XXXX | 18 | 16 | −2 |
| 000000000000000000001XXX | 19 | 20 | +1 |
| 0000000000000000000001XX | 20 | 20 | 0 |
| 00000000000000000000001X | 21 | 20 | −1 |
| 000000000000000000000001 | 22 | 20 | −2 |

X = don't care

FEATURES OF THE PRESENT INVENTION

The method used in this invention is to monitor the scaling network at its lowest level, and then generate a scale correction of +1, −1, or 0 for each sub group of four bits. This technique takes advantage of the inherent design capabilities of a conventional binary scale factor generation network. The actual realization of the design added no levels to the binary scaling except for a final incrementer/decrementer on the output of the scaling network, which was also required for the decimal scaling mode.

As can be noted in the Tables 1 and 2, the pattern of correction values required for octal scaling repeats every 12 binary bit positions. While three correction factors are shown, +1, −1, and 0, only two need to be detected since the third can be derived by the absence of the two that are detected. Therefore, in the actual implementation only the +1 and −1 factors are detected.

While it is theoretically possible to construct a scale factor generating network in a single logic level, circuit complexity makes this solution undesirable. The disclosed system instead divides the system into a series of logic levels, each of which uses the results of the previous level to reduce the amount of logic required and to produce some of the bits of the final scale count.

Figures 1A, 1B, 1C:
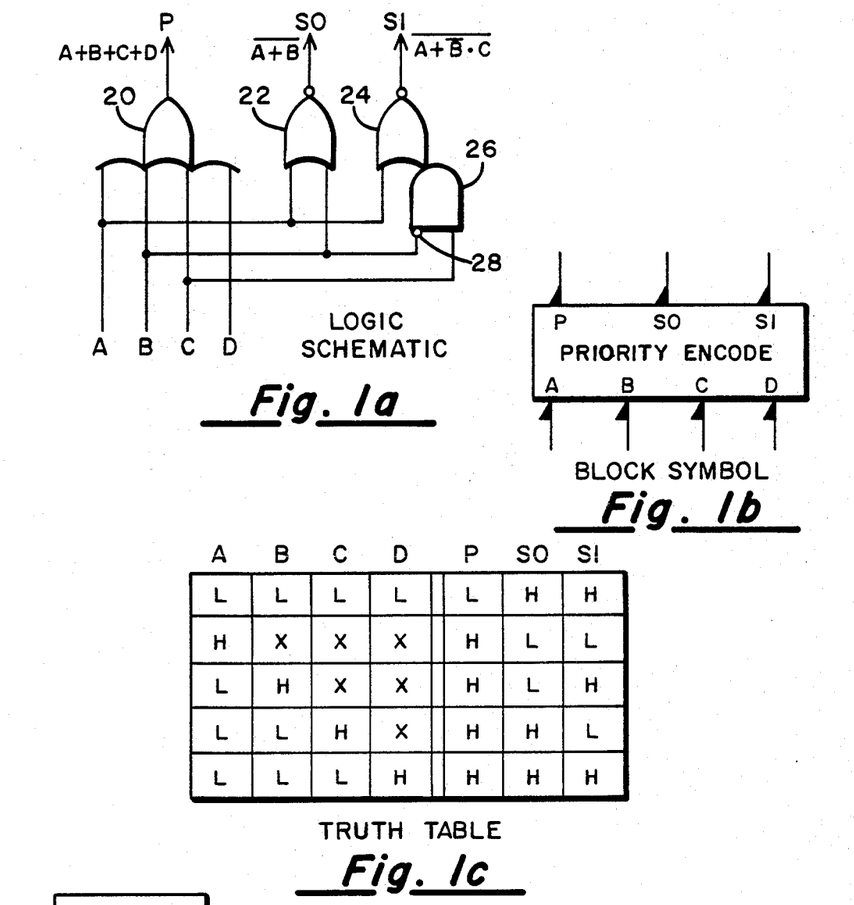

A priority encoder is shown in FIG. 1a which is constructed from the cells of a gate array, which may be a series gated ECL gate array. The illustrated circuit is a four input priority encoder, which looks at four binary bits and produces a two bit binary count that corresponds to the first non-zero input found.

TABLE 2

Scale Count Correction for Octal Scaling

| INPUT BINARY NUMBER | SCALE COUNT BINARY | SCALE COUNT OCTAL | CORRECTION FACTOR |
|---|---|---|---|
| 01XXXXXXXXXXXXXXXXXXXXXX | 0 | 0 | 0 |
| 001XXXXXXXXXXXXXXXXXXXXX | 1 | 0 | −1 |
| 0001XXXXXXXXXXXXXXXXXXXX | 2 | 3 | +1 |
| 00001XXXXXXXXXXXXXXXXXXX | 3 | 3 | 0 |
| 000001XXXXXXXXXXXXXXXXXX | 4 | 3 | −1 |
| 0000001XXXXXXXXXXXXXXXXX | 5 | 6 | +1 |
| 00000001XXXXXXXXXXXXXXXX | 6 | 6 | 0 |
| 000000001XXXXXXXXXXXXXXX | 7 | 6 | −1 |
| 0000000001XXXXXXXXXXXXXX | 8 | 9 | +1 |
| 00000000001XXXXXXXXXXXXX | 9 | 9 | 0 |
| 000000000001XXXXXXXXXXXX | 10 | 9 | −1 |
| 0000000000001XXXXXXXXXXX | 11 | 12 | +1 |
| 00000000000001XXXXXXXXXX | 12 | 12 | 0 |
| 000000000000001XXXXXXXXX | 13 | 12 | −1 |
| 0000000000000001XXXXXXXX | 14 | 15 | +1 |
| 00000000000000001XXXXXXX | 15 | 15 | 0 |
| 000000000000000001XXXXXX | 16 | 15 | −1 |
| 0000000000000000001XXXXX | 17 | 18 | +1 |
| 00000000000000000001XXXX | 18 | 18 | 0 |
| 000000000000000000001XXX | 19 | 18 | −1 |
| 0000000000000000000001XX | 20 | 21 | +1 |
| 00000000000000000000001X | 21 | 21 | 0 |

TABLE 2-continued

| Scale Count Correction for Octal Scaling | | | |
|---|---|---|---|
| | SCALE COUNT | | CORRECTION |
| INPUT BINARY NUMBER | BINARY | OCTAL | FACTOR |
| 000000000000000000000001 | 22 | 21 | −1 |

X = don't care

Figure 2A:
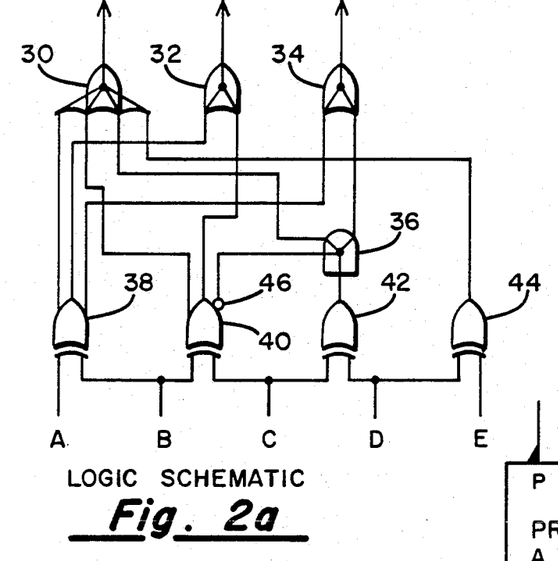
FIG. 2a is a schematic of an algebraic priority encoder which utilizes a sign bit.

When it is desirable to produce scale counts for both positive and negative numbers, a second form of priority encoder, called an algebraic priority encoder, is shown in FIG. 2a. This circuit may be used to produce a binary count that is equal to the first non-sign bit that is detected. In FIG. 2 the count signal outputs are "inverted" with respect to conventional polarity in that a high output (H) indicates a binary 0, while a low output (L) indicates a binary 1.

The algebraic priority encoder of FIG. 2a also differs from the priority encoder of FIG. 1a due to the addition of a fifth input A that is provided as a reference signal to indicate the significance of the priority detection level. This input is tied to the "sign" or reference bit of a subgroup of bits so when any bit of the group is opposite in polarity to the signal on input A a corresponding count output results which is detected. This means that the sign bit and subsequent reference bits applied to input A of any algebraic encoder need only drive one input.

In addition to producing the binary scaling value for the four bits under evaluation, a third signal output is generated by an algebraic priority encoder when a non-zero or a non-sign bit is detected within the group.

This signal is referred to as a "priority" signal or "active" signal. Since each priority encoder circuit looks only at a four bit group, multiple circuits are required to span the bit range of the input number. In the described embodiment this is 72 bits which results in 18 circuit blocks. Each of these circuit blocks produces a two bit count and an "active" signal for its own specific group. The first rank, therefore, reduces the search from 72 inputs to 18 active signals, plus 18 sets of two-bit codes, which represent the position within the subgroup at which the first significant bit is found.

System Overview

Figure 3:
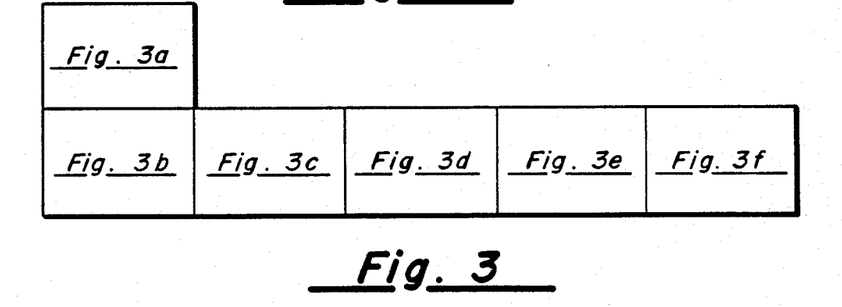
FIG. 3, consisting of FIGS. 3a-3f, is a block diagram of a 72 bit scaling generator which includes an octal sense correction network.
Figure 3A:
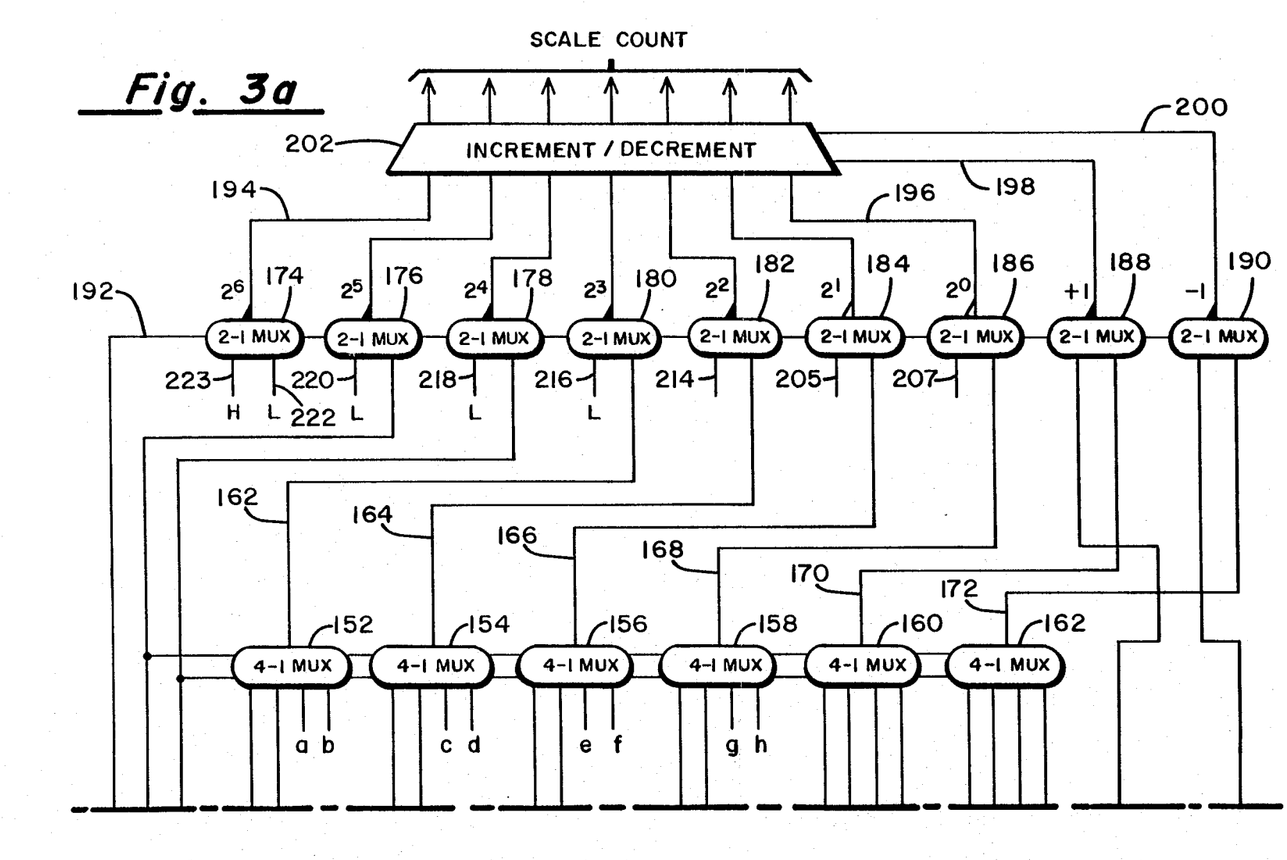
Figure 3B:
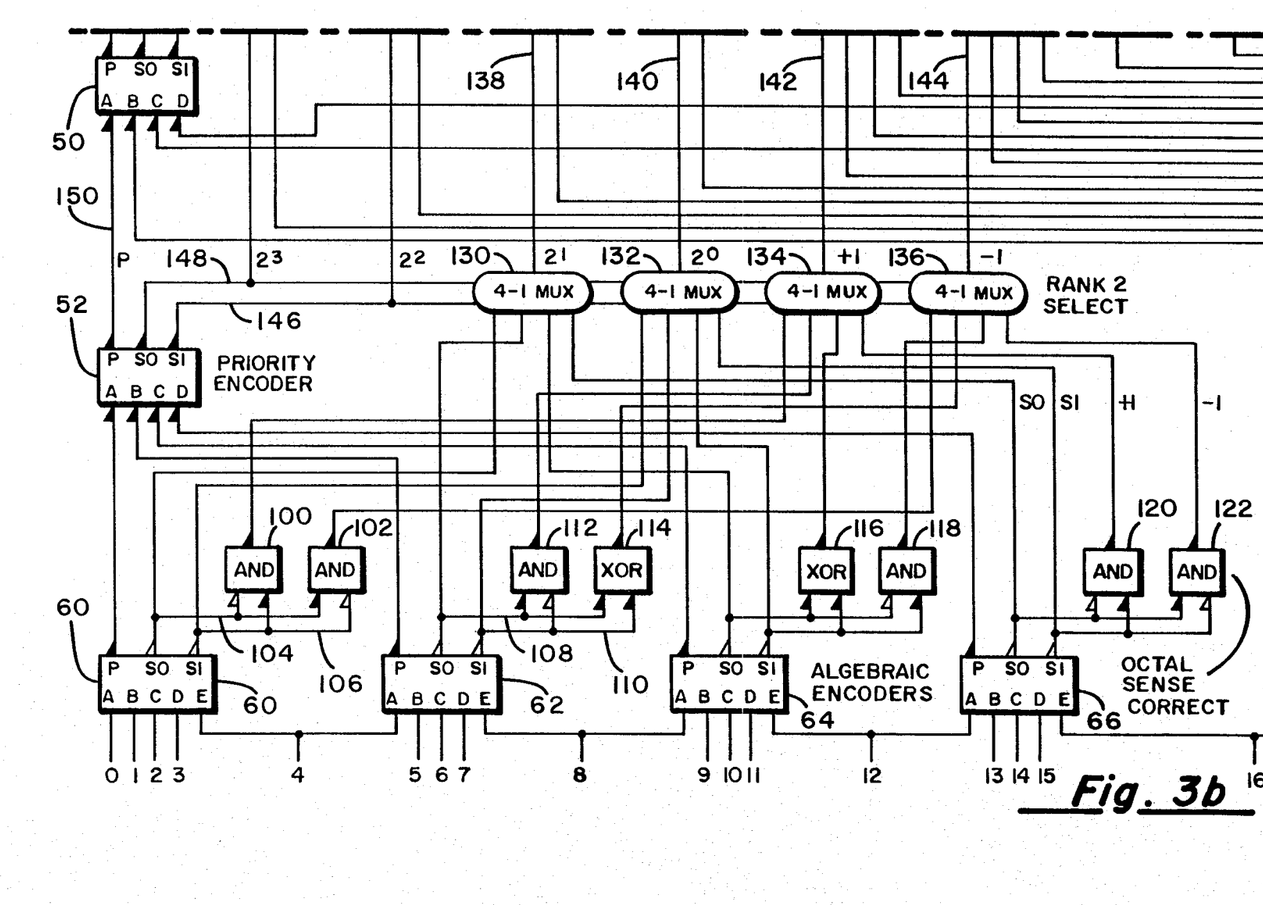
Figure 3C:
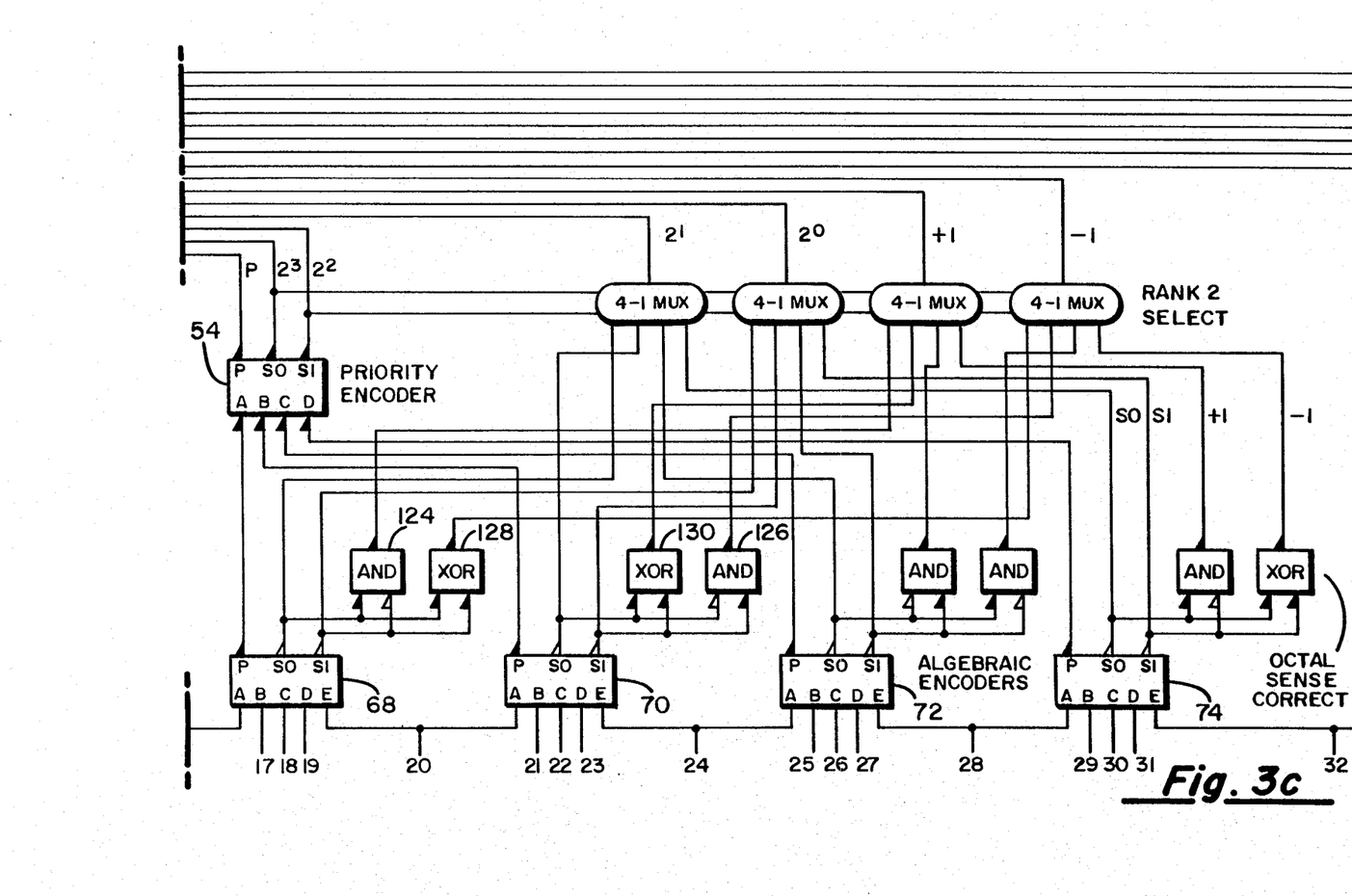
Figure 3D:
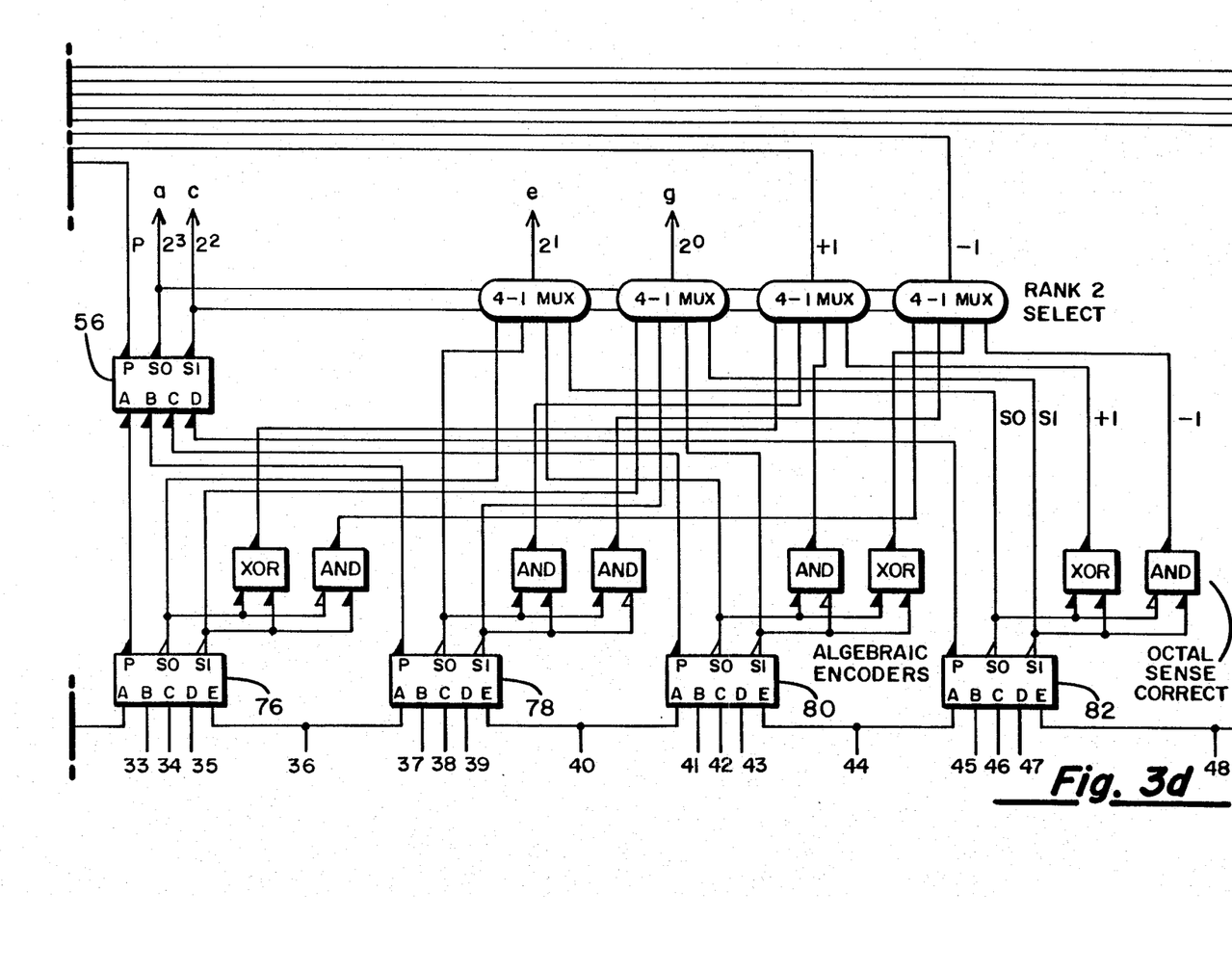
Figure 3E:
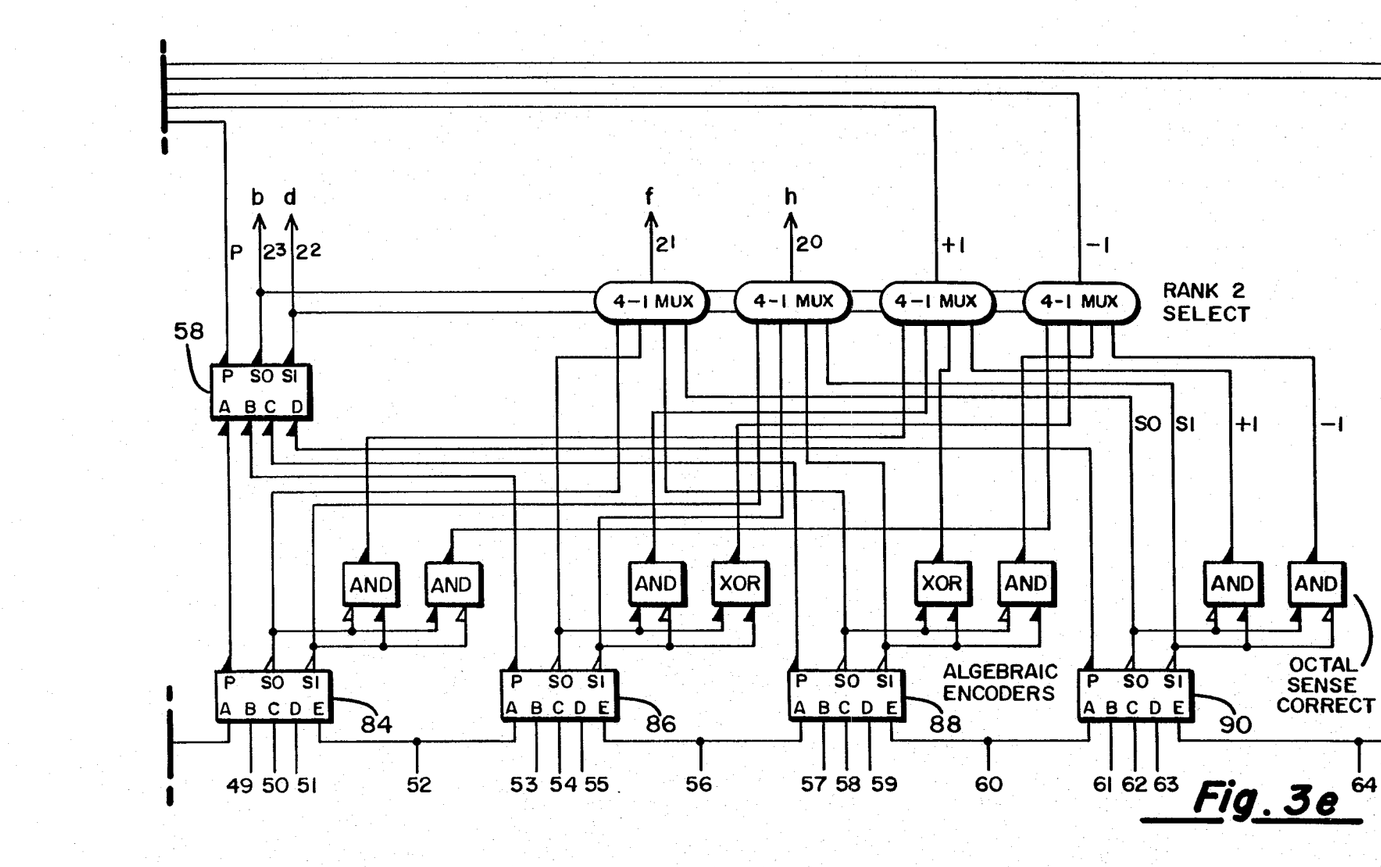
Figure 3F:
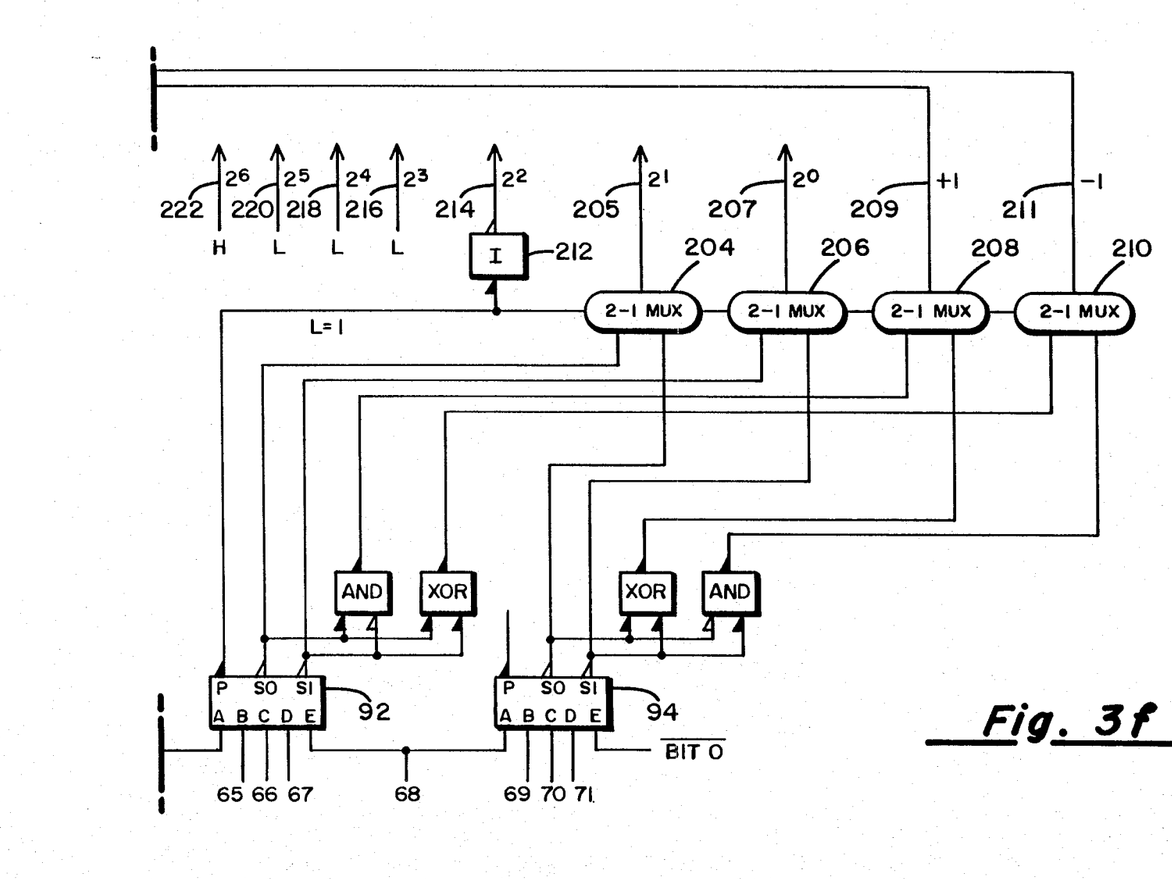

FIG. 3 shows a block diagram of a 72 bit normalizer that is constructed with a first rank of algebraic encoders, two ranks of ordinary priority encoders and a final priority level that generates the scaling count. The first rank's priority signals are collected and examined in a second rank of priority encoders which reduces the 18 first rank signals to 5. These are, in turn, collected in a third rank which reduces the 5 signals to 2, and finally a fourth rank, (a simple selection level circuit), is added that produces a single signal.

At each rank after the first rank the count signals are used to select the previous rank's count signals and, together with its own count signals, are sent to the next rank to form the binary normalization count as this level is traversed. A complete seven bit number is available at the fourth rank which is used as a left-shift count to left-align the input number with the sign bit, which is followed to the right by the first significant bit and the remainder of the number.

In order to allow the binary normalizer to generate a scaling count in three bit groups, two logic circuits are added to each four bit group of the first rank encoders The purpose of these circuits is to examine the two bit count generated by each encoder, and to signal if the count selected by the next rank of encoders is to be adjusted by +1, −1, or 0. Only the cases of +1 and −1 correction factors, however, are detected and passed together with the binary position encoded information.

FIG. 3 illustrates these circuits for three-four bit groups. The pattern of circuits repeats for each additional set of three groups. When the final rank is reached, in addition to the binary scaling count, two signals are available to determine whether the count is to be adjusted by adding 1 or subtracting 1 from the final count. This function is accomplished in a seven bit ±1 network, from which the final scaling count is derived. Since the two detection circuits are placed at the first level, they are logically in parallel with the second rank encoders, and appear prior to the selectors that collect the first rank counts. They, therefore, do not add logic levels to the overall network. The only additional levels required are in the final ±1 network.

With this invention a scale factor generator may be adapted to scale numbers to different binary groupings. While the specific invention is for the purpose of scaling to groups of one, three, and four bit groups, other groups are possible using the same basic concept. By sensing the correction factors at the first level of the tree, the logic levels to implement the design are kept to a minimum.

The Priority Encoder

FIG. 1a shows a block diagram representation of the Priority Encoder which is used in the multi-function scaler of the present invention. FIG. 1b is a schematic which shows the logic circuit gates that are incorporated into the block of FIG. 1a. The truth table of FIG. 1c illustrates the operation of the Priority Encoder. In the truth table the four input lines which are labelled A, B, C and D are represented in the top row across the truth table. To the right of these are the labels P, $S_0$, $S_1$. These symbols P, $S_0$ and $S_1$ represent the output lines from the Priority Encoder. The L and H symbols in the truth table respectively represent a "low" or a "high" logic level signal.

When the logic input signal on the input lines A, B, C and D are evaluated by the Priority Encoder, the output signals which result on the lines P, $S_0$ and $S_1$ are illustrated in the truth table for the various possible combinations of the input signals. An "X" in the table below any of the input lines indicates that it is immaterial to the logic circuit, or that it "does not care" whether the signal is a low or a high, since the remaining input lines which are not associated with the "X" determine the state of the output lines. In the representative embodiment, it may be assumed that a low signal represents a logic "0", and a high signal represents a logic "1".

The Priority Encoder includes four logic gates, an OR gate 20, a NOR gate 22, a second NOR gate 24 and an AND gate 26 which has an inverter 28, indicated by a circle, coupled to one of its two input lines. The OR gate 20 is a four input gate which receives all of the input lines A, B, C and D, and which provides the signal P as an output signal. The NOR gate 22 receives only the inputs A and B, and the $S_0$ signal which it produces is, therefore, represented by $\overline{A+B}$. In other words, the output from the $S_0$ line is a NOT-OR logic representation.

The AND gate 26 receives the C input signal directly into one of its input terminals, and the B signal which is inverted through the inverter 28 on the input of the AND gate 26. The output of the AND gate 26 is then fed to one input of the two input gate NOR 24. The other input of the NOR gate 24 is the A input signal. The output of the AND gate 26 is, therefore, $\overline{B}.C$. The combined output on the line $S_1$ from the NOR gate 24 is then represented by $\overline{A+\overline{B}.C}$.

The functioning of the priority encoder can best be illustrated by reference to the truth table of FIG. 1c. D is the least significant input bit and A is the most significant bit of this table. Correspondingly, $S_1$ is the least significant output bit while $S_0$ is the most significant output bit. The P output line indicates whether or not a "1" occurs for the input bits A, B, C or D.

As shown in the top row of the truth table, when all of the input bits A, B, C and D are at a "0" logic or "low" level, the output bit P is then "low" and the output bits $S_0$ and $S_1$ are both "high". In the second row the A line is "high", or at a logic "1" level, and thus the states of the B, C and D lines are immaterial, and the truth table thus shows an "X" under these lines. When a "1" or a "high" level is present on input line A, the P output bit will be at a "high" or "1" state. The lines $S_0$ and $S_1$ in this instance will both be at a "low", or "0" level, which indicates a binary coded representation of 0. The input lines for the priority encoder of FIGS. 1a, 1b and 1c are counted as 0, 1, 2 and 3 proceeding from line A toward line D. A code of 3, therefore, indicates that it is the D line, which is at a "high" or "1" level and all others (A, B, C) are at a "low" or "0" level.

Correspondingly, as shown in row 3 of the table, if the A is "low", or at a "0" logic level, but the B line is at a high logic level, then the state of the lines C and D will be immaterial. The P line then will, of course, remain "high" or at a logic "1" level. The $S_1$ and $S_0$ lines will now respectively indicate codes of "0" and "1", which specifies a binary 1 that signifies that the input line B is the most significant input bit which has an applied "1" or "high" level.

Likewise, as shown in row 4 of the table, if C becomes the most significant bit which has a "high" or "1" state, the lines A and B will be "low", and the output lines $S_0$ and $S_1$ will thus be "high" and "low", respectively.

If all of the input lines A, B, C are "low" and the line D is "high", then $S_0$ and $S_1$ will both be "high" indicating that there is a "high" or a "1" level on the least significant input line D. This is shown in the lowermost row of the table.

The Algebraic Priority Encoder

Figure 2B:
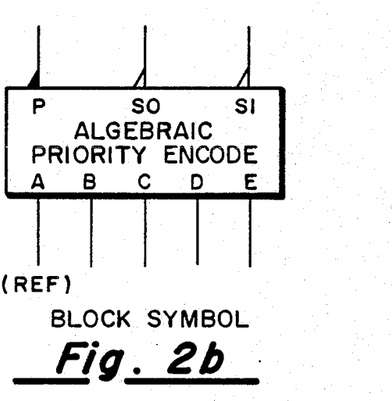
Figure 2C:
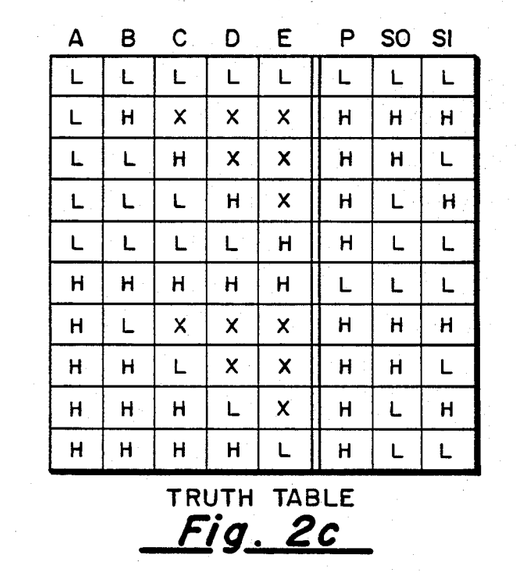

The multi-function scaler described herein also employs a second basic encoding circuit which is an algebraic priority encoder. The block diagram for this algebraic priority encoder is shown in FIG. 2a. FIG. 2b is a logic schematic which shows the implementation of the algebraic priority encoder of FIG. 1a. FIG. 2c is a truth table for the algebraic priority encoder of FIGS. 2a and 2b.

The 72-bit scaler of the present invention utilizes five priority encoding circuits of the type shown in FIGS. 1a, 1b and 1c and eighteen algebraic priority encoding circuits of the type shown in FIG. 2a, 2b and 2c. The algebraic priority encoding circuit has five input signals, A, B, C, D and E, and has three output signals, P, $S_0$ and $S_1$. The circuit utilizes three wired OR gates 30, 32 and 34 and a wired-AND gate 36 to ensure fast response. In addition, there are four exclusive-OR gates 38, 40, 42 and 44. Each of the exclusive-OR gates 38–44 has two input terminals, and each of the input terminals receives one of the signals A, B, C, D or E. For example, the two inputs of the exclusive-OR gate 38 receive the signals A and B, the inputs of the exclusive-OR gate 40 receive the signals B and C, the exclusive-OR gate 42 receives the signals C and D, and, finally, the exclusive-OR gate 44 receives the signals D and E.

The exclusive-OR gates 38 and 40 each fan out to three locations. For example, the gate 38 supplies its output to one input of the wired-OR gate 30, to one input of the wired-OR gate 32 and to one input of the wired-OR gate 34. By the same token, the exclusive-OR gate 40 fans out to the wired-OR gate 30 and the wired-OR gate 32. An inverter 46, indicated by a small circle on FIG. 2a, also supplies an output of the gate 40 to the wired-AND gate 36. The other input of the two input wired-AND gate 36 is derived directly from the output of the exclusive-OR gate 42. The AND gate 36 supplies its output to an input of the wired-OR gate 30 and also to the wired-OR gate 34.

By using the algebraic priority encoder of FIGS. 2a, 2b and 2c negative numbers are taken into account. When a negative number is present, the A input line is at a high or logic 1 level. It is seen, therefore, that all of the five bottom rows of Table 2c show a high level for line A. It should be noted that the logic levels for the last five rows for the inputs B, C, D and E are just the inverse of the corresponding first five rows. For example, the B, C, D and E signals in row 6 are the exact inverse of the same signals in row 1. In a similar manner, the signals in row 7 are the inverse of those in row 2. For example, in row 7 the logic signal B is at a "low" or "0" level, and there is a don't care condition indicated by "X"'s for the signals C, D, and E.

The $S_0$ and $S_1$ levels of the algebraic priority encoder are the inverse of the signal states found in the priority encoder because of the way that the circuit is implemented. Other implementations are possible within the scope of the invention which utilize the same polarity conventions. For example, in row 2 of the table the B signal is at a high level or "1" level and lines C, D and E are again in a don't care condition, the corresponding output signal that is provided, the output lines P, $S_0$ and $S_1$ for row 7, however, match the logic levels for the same output signals for row 2. Thus, in row 6 all of the output lines P, $S_0$ and $S_1$ will be low when all of the lines A, B, C, D and E are high. This corresponds to the same output state for the lines P, $S_0$ and $S_1$ when all of the input lines A, B, C, D and E are low for row 1.

Considering the E input as the 3 position for the algebraic priority encoder of FIGS. 2a, 2b and 2c, the D input is then the bit position 2 signal, the C input is the bit position 1 signal, the B input is the bit position 0 signal, and the A input is the sign or reference bit signal. The output lines P, $S_0$ and $S_1$ then provide a coded bit output which indicates the bit position at which either the first "0" or the first "1" occurs according to the logic level state of the sign bit A. For example, when the input line A is at a logic "low", or "0" level, the output signals on the lines P, $S_0$ and $S_1$ represent the signal position at which the first logic "high" or "1" signal appears.

When all of the input lines A-E either are at a low or high level, then the output line P will also be at a low level which indicates all of the input lines are at the same level, as shown in the top row of Table 2. If any of the input signals B, C, D or E, however, are at a different level than the A level, then the output P will be at a high level. This means the count that appears on the output lines $S_0$ and $S_1$ may be used to determine the position of the first "0" or first "1" signal for the lines B, C, D and E. The state of the line A indicates whether the number is a positive or a negative number. When the line A is at a "high" or "1" level, the number represented by B, C, D and E will be a negative number, while when the line A is at a "low" or logic "0" level, the lines B, C, D and E represent a positive number.

Beginning with the top row, or row 1, it is seen that when all of the lines A-E are at a low level and a positive number is represented, then all of the output signal lines P, $S_0$ and $S_1$ will be at a low level also. The low level P output signal indicates that all of the input lines are A-E at either the same low or high level, and the binary coding that is signified by the output lines $S_0$, $S_1$ has no significance.

If the B input line goes to a high level while the A line is low, the P output line will correspondingly change to a high level. In this instance the signals on the lines $S_0$ and $S_1$ will go to a high level which indicates that the B input line (or the 0 input line for this circuit) is the highest positioned line that is at a high level when the A line is at a low level. If it is next assumed that the first, or highest positioned input line which has a high level on it is the C line when the A line is low, as shown in row 3, then the P line will remain at a high level, and the lines $S_0$ and $S_1$ will go to high and low states, respectively. The count 1 represented by this condition indicates that the C line will be the first, or most significant, line with high or "1" signal on it. In row 4 the lines A, B, and C are all low while the line D is high.

This results in a low signal on $S_0$ and a high signal on $S_1$, for a count of 2, which is representative of the fact that the D line is the most significant bit line which is at a high, or logic 1, level. In the 5th row all of the input lines A-D are at a low level, but line E is at a high level, and this is represented by low levels on both $S_0$ and $S_1$ which represents a count of 3 that indicates the E line is the only high input line.

The next five lines of the truth table are representative of negative numbers, and, therefore, the sign bit A will be high for these numbers. When all of the input lines A-E are high then the P line will be low, and the lines $S_0$ and $S_1$ will also be low. This is again representative of the fact that all of the lines have the same signal on them, which may be either all low or all high, as shown in rows 1 and 6, respectively. It is seen also that the output signals on the lines P, $S_0$ and $S_1$ for row 7 are respectively all high, the same as they were for row 2. In row 2 the first high appears on line B, while in row 7 the first low appears on the line B in FIG. 7, which is represented as being the zero position line in the algebraic priority encoder. The output signals $S_0$ and $S_1$ for row 8 thereby correspond to the same output signals for row 3, but the signals are inverted for inputs B and C. In row 9 the output signals $S_0$ and $S_1$ correspond to those for row 4, and the signals B, C, D are again inverted in row 9 relative to row 4, with E being in a "don't care" state. For row 10 the P signal is high and the signals $S_0$ and $S_1$ are both low, just as they were in row 5 and all of the signals A-E in the two rows are the inverse of each other.

The complete block diagram of the multi-function scaler is shown in FIG. 3 in which five circuits of the priority encoder type of FIG. 1 and eighteen circuits of the algebraic priority encoder type of FIG. 2 are utilized in a 72-bit implementation. The five priority encoder circuits are labelled 50, 5, 54, 56 and 58. The eighteen algebraic priority encoder circuits are represented by the element numbers 60-94. Starting from the bottom of FIG. 3, the first level of logic consists of the algebraic priority encoders which receive the 72-bit input. The priority encoding circuits 52-58 comprise a second encoding level.

The $S_1$ and $S_0$ output lines from the algebraic priority encoder circuits 60-94 are coupled to logic gates, which are connected in pairs in a repetitive order, as illustrated in FIG. 3. For example, the AND gates 100 and 102 are coupled to the outputs $S_0$ and $S_1$ of the most significant algebraic priority encoder 60. The triangles that are shown on the output lines or on the inputs to the logic circuits are utilized to represent either an output signal or its inverted value. When the triangle is not filled (i.e., it is white), it passes through with inversion, but when the triangle is filled (i.e., it is black), the signal is not inverted. Thus, it is seen that the $S_0$ and $S_1$ signals from the algebraic priority encoder 60 are inverted when they are supplied to the lines 104 and 106 and to one of the inputs of the AND gates 100 and 102, respectively. However, the $S_0$ signal on the line 104 is also supplied to the other inputs of the AND gate 100 through an inverter, while the $S_1$ signal on the line 106 is inverted (as indicated by a filled-in triangle) before it is applied to the other input of the inverter 102. The outputs of the AND gates 100 and 102 are inverted.

The first rank of algebraic priority encoders are grouped into code groups of three, thus the encoders 60, 62 and 64 form an encoding group, the encoders 66, 68 and 70 form another group and so forth. The input signals which are represented by the numbers 0, 1, 2, 3 and 4 that are supplied to the input lines A, B, C, D and E, respectively, of the algebraic priority encoder are numbered with 0 being the most significant bit of the 72-bit input number. Bit 4 is supplied both to the E input of the encoder 60 and to the A input of th algebraic priority encoder 62.

The $S_0$ and $S_1$ outputs from the algebraic priority encoder 62 are inverted as they pass from the algebraic priority encoder and are applied to the lines 108 and 110 for application to the AND gate 112 and the exclusive-OR circuit 114. Again the $S_0$ input is not inverted, while the $S_1$ input is inverted before they are applied to the AND gate 112. Both the $S_1$ and $S_0$ inputs are applied to the two inputs of the exclusive-OR gate 114. The outputs of the AND gate 112 and the exclusive-OR gate 114 are not inverted.

The third algebraic priority encoder 64 of the first set of Algebraic Priority Encoders has another pair of logic gates associated with it, the exclusive-OR gate 116 and the AND gate 118. The exclusive-OR gate 116 receives the inverted input signals $S_0$ and $S_1$ from the encoder 64. The AND gate 118 receives the $S_0$ signal in an inverted state on one input while the $S_1$ signal is applied to the other input of this gate. Again the outputs of the exclusive-OR gate 116 and the AND gate 118 are not inverted.

The combination of the AND gates 100, 102, 112 and 118 and the exclusive-OR gates 114, 116 form an octal sense connection network to provide the required correction factor that is indicated in Table 2. The eighth input bit is connected to both of the inputs E of the algebraic priority encoder 62 and the input A of the algebraic priority encoder 64. This same pattern of six logic gates is repeated for each of the remaining sets of algebraic priority encoders, which are grouped into groups of three. Thus, the algebraic priority encoders of the second group to the right consisting of the encoders 66, 68 and 70 have a corresponding associated set of gates consisting of AND gates 120, 122, 124, 126 and exclusive-OR gates 128 and 130, and this same pattern repeats as can be shown in the figure for each group of three algebraic priority encoders.

While the aforementioned logic gates are associated with a group of three algebraic priority encoders, the encoding circuits of the second encoding level are associated with groups of four algebraic priority encoders. As shown, the P output signal from the algebraic priority encoder 60 on the line 131 is applied to input A of priority encoder 52. The P output signal from the algebraic priority encoder 62 is supplied on line 133 to the B input of the algebraic priority encoder 52. Similarly, the P output from the algebraic priority encoder 64 is supplied to the C input on the algebraic priority encoder 52, while the P signal from the algebraic priority encoder 66 is supplied to the D input of the algebraic priority encoder 52. In a corresponding manner, the next group of four algebraic priority encoders 68, 70, 72 and 74 have their P output signals coupled to the inputs of the algebraic priority encoder 54.

Four-by-one multiplexers are associated with each group of four algebraic priority encoders and the Priority Encoder connected with this group. For example, the four-by-one multiplexers 130, 132, 134 and 136 are grouped and interconnected to the algebraic priority encoders 60, 62, 64, 66, the priority encoder 52 and the logic gates 100, 102, 112, 114, 116, 118, 120 and 122. The multiplexer 130 provides an output on the line 138 which represents $2^1$. The output of the multiplexer 132 on the line 140 represents $2^0$. The output on the line 142 from the multiplexer 134 represents a $+1$, while the output 144 from the multiplexer 136 represents a $-1$. The $S_1$ signal from the priority encoder 52 is supplied on the line 146 to represent $2^2$, while the $S_0$ signal supplied on the line 148 represents $2^3$. The P signal is supplied on the line 150 to another priority encoder 50.

The signals on the lines 146 and 148 are utilized as the select signals for the multiplexers 130-136. The multiplexer 130 receives the inverted $S_0$ outputs of all of the algebraic priority encoders 60, 62, 64 and 66, and when this multiplexer is selected it supplies the $2^1$ output signal. The multiplexer 132, on the other hand, receives the $S_1$ signal lines from the algebraic priority encoders 60-66 to supply the $2^0$ output.

The multiplexer 134 receives the output from the AND gate 100, the inverted output from the AND gate 112, the output from the exclusive-OR gate 116 and the output from the AND gate 120. The resulting output signal on the line 142 represents a $+1$ signal. The multiplexer 136 receives one input which is from the AND gate 102, the output from the exclusive-OR gate 114, the inverted output from the AND gate 118, and an output from the AND gate 122 to supply the $-1$ signal on the line 144. Three more sets of four multiplexers each are grouped with the algebraic encoders shown to the right of the algebraic encoders 60-66 in the figure. The connections in the logic gates for the last two priority encoders 92 and 94 differ from the other groups of encoders as will be discussed subsequently.

A second row of six 4×1 multiplexers are selected by the $S_0$ and $S_1$ outputs of the priority encoder 50. These multiplexers are labelled 152-166. The inputs to the multiplexer 152 are the $S_0$ outputs from the priority encoders 52, 54, 56 and 58. The output signal on the line 162 represents $2^3$. The multiplexer 154 has inputs from the $S_1$ outputs of the priority encoders 52-58 and provide a $2^2$ signal on the output line 164. The multiplexer 156 supplies a $2^1$ signal on the line 166, and it receives the $2^1$ outputs which represent this value from the multiplexers, such as the multiplexer 130, of each of the multiplexing group. In a like manner, a $2^0$ signal is supplied on the line 168 by the multiplexer 158 from inputs supplied by the corresponding multiplexers, such as the multiplexer 132, of each group. The $+1$ multiplexers of each group supply their inputs to the multiplexer 160 which supplies a $+1$ signal on the line 170 for this rank of multiplexers. The $-1$ group of multiplexers supplies their input to the multiplexer 162 which supplies the $-1$ signal on the line 172 for this same rank of multiplexers.

The final level of nine 2×1 multiplexers is shown on the top left-hand side of FIG. 3. These are the multiplexers 174-190. The select line for these multiplexers is the P output signal on the line 192 from the priority encoder 50. The multiplexer 174 provides an output signal on the line 194 which represents $2^6$. The outputs of the multiplexers 174-186 represent bits of decreasing significance proceeding to the right until the least significant bit $2^0$ is provided by the multiplexer 186 on the line 196. As shown by the open triangles, the signals from the multiplexers 184 and 186 are inverted to provide appropriate polarity output signals while the rest are already of proper polarization and therefore need no inversion. The multiplexer 188 supplies the $+1$ final output signal, and the multiplexer 190 provides the final level $-1$ output signal on the line 200.

All of these signals from the multiplexers 174-190 are supplied to an increment-decrement circuit 202. It is seen that the corresponding signals $2^3$ through $2^0$ and $+1$ and $-1$ which are supplied by the row of multiplexers 152-162 are supplied to the multiplexers 180-190, and that the output lines from these multiplexers represent the same corresponding values. It is noted that multiplexers 176-180 are 2×1 multiplexers and that they each have a second input line that is tied respectively to either a permanent "high" or a "low" state to achieve the proper output representation of a logic "1" or a logic "0".

Proceeding to the far right-hand side of FIG. 3 to the algebraic priority encoders 92 and 94, it is seen that the repetitive pattern that existed for the first four groups of algebraic priority encoders of four encoders each does not follow with respect to the circuitry associated with the algebraic priority encoders 92 and 94. These algebraic encoders are associated with the least significant bits of the 72-bit number. It is noted that the bit 64 is connected to the input line E of the algebraic encoder 90 and the input line A of the algebraic encoder 92, while the bit 68 is connected to the input line E of the Algebraic Priority Encoder 92 and the input line A of the Algebraic Priority Encoder 94. However, the $\overline{E}$ input line of the algebraic encoder 94 receives a Bit 0 signal on the inverse of the Bit 0 level which signifies that the E input to the algebraic priority encoder 94 receives the inverted most significant bit, or the sign signal, whether it be a "0" or a "1". This is to guarantee that the algebraic encoder 94 will generate a number if all of the bits of input number are "1"'s or "0"'s. (In 1's complement arithmetic all "0"'s represent the number zero, and all "1"'s is generally not employed to represent a number.)

Although there are only two algebraic encoders 92, 94 in the last group of encoders, it is noted that the repetitive pattern of twelve logic gates is repeated and ends with the fourth group of such twelve gates, so that the pattern of AND gate/exclusive-OR gate/AND gate/exclusive-OR is completed by connection of these gates to the algebraic priority encoders 90, 92, and 94. The rank 2 select multiplexers associated with the last two algebraic encoders 92 and 94 are four 2×1 multiplexers 204 and 206, which respectively indicate the $2^0$ and the $2^1$ bits, and the multiplexers 208 and 210 which indicate the +1 and −1 signals associated with the least significant bits. An inverter 212 is coupled to receive the P signal from the priority encoder 92 to supply a true polarity signal for bit $2^2$ of the count on the line 214. The lines 216–218 and 220 are coupled to a permanent low level to indicate a logic "0" output for the bits $2^3$ through $2^5$. The output line 222 is coupled to a permanent high level to indicate a logic "1" signal for the bit $2^6$.

The lines 222, 223 is coupled to the multiplexer 174, while the lines 220, 218 and 216 are respectively coupled to the multiplexers 176, 178 and 180. The inverted signal on the line 214 is coupled to the multiplexer 182. Correspondingly, the outputs from the multiplexers 204, 206, 208 and 210 are respectively coupled to the multiplexers 184–190. By coupling the lines 216–222 to permanent logic levels and by inverting the P output signal for the inverter 212, the scaling conversion for the least significant bits is completed.

In operation the system of FIG. 3, therefore, searches for the most significant bit that differs from the sign bit applied to the A line of the algebraic priority encoder 60. For example, if lines A, B, C, E to the encoder 60 are at the same logic level as the input A, whether it be a "high" or a "low" level, the P output will be "low" as will the $S_0$ and $S_1$ signals, as previously noted.

This same combination of P and $S_0$ and $S_1$ signals will exist for each of the algebraic priority encoders 62–94 until the first input line, proceeding to the right toward less significant bits, is reached that has the opposite level.

For example, if the most significant input that has a logic level different from the level of the signal on the input A of the encoder 64 is in input A to the encoder 70, then the P output of the encoder 70 will be the first algebraic priority encoder from the left side of the circuit drawing that has a high output. The $S_0$ and $S_1$ signals will then, of course, both provide "high" level signals also, as previously noted.

The combination of all P, $S_0$ and $S_1$ low level signals for encoders 64–68 and the above-noted P, $S_0$ and $S_1$ for the encoder 70 then provides the necessary scaling count through the cascade levels of logic described previously and the increment/decrement circuitry. The octal sense connections factor is provided through the AND and XOR logic gates, such as the gates 100, 102, 112 and 114 which are coupled as described herein, and as shown in FIG. 3.

The priority encoders 52, 54, 56, 58 are used to determine which group of four algebraic priority encoders have the first P "high" output. If the algebraic priority encoder 70 is the first one, then the priority encoder 54 will provide a high P output while the P output of the priority encoder 52 will be low. The $S_0$ and $S_1$ outputs of the priority encoder 54 then will indicate which algebraic priority encoder has the most significant line that is different than the sign input A to the algebraic priority encoder 60. The priority encoder 50 then indicates which group of algebraic priority encoders this algebraic priority encoder is in. The combination of all of these signals, which are supplied through the various multiplexers provides the desired justification and scaling.

We claim:

1. A scaler for the justification of binary numbers having an excess number of sign bits comprising, encoding means partitioned into a plurality of sub-encoding means wherein a first sub-encoding means receives the most-significant sign bit of the number, and a plurality of the next most-significant bits of the number, and the remaining sub-encoding means of said plurality, and each receives a number of successive bits of the binary number which are equal in number to the number of next most-significant bits plus the sign bit that is supplied to said first encoding means, and all of the bits of the number are supplied to said encoding means, each of said sub-encoding means being constructed so that an output signal is provided which indicates whether or not all of the bits supplied to said sub-encoding means are of the same value as the most-significant bit applied to said sub-encoding means, and an output count that signifies which of the bits supplied to said sub-encoding means is the next most-significant bit that differs in value from the most-significant bit supplied to said sub-encoding means, and scale count means coupled to said encoding means for providing a scale count representation of the number of next most-significant bits of said binary number that are of the same value as said most-significant sign bit.

2. A scaler for the justification of binary numbers having an excess number of sign bits as claimed in claim 1 further comprising correction factor means coupled to said encoding means for providing a correction factor count required to connect a justified number from one numbering system to another.

3. A scaler for the justification of binary numbers having an excess number of sign bits as claimed in claim 2 wherein said least-significant bit of said binary number that is supplied to each sub-encoding means, except for the least-significant bit of said binary number, is also supplied as the most-significant bit to another sub-encoding means, and said correction factor means comprises octal sense correction means coupled to receive said output counts of said plurality of sub-encoding means.

4. A scaler for the justification of binary numbers having an excess number of sign bits as claimed in claim 1 wherein said sub-encoding means are constructed such that the logic level of said output signals from said sub-encoding means and said output count from said sub-encoding means depend only on the position of the next most-significant bit of the number that differs from the most-significant sign bit of the number, and not upon the value of said sign bit.

5. A scaler for the justification of binary numbers having an excess number of sign bits as claimed in claim 4 wherein said sub-encoding means is arranged into a first logic rank, and said encoding means comprises at least one subsidiary sub-encoding means arranged in a second logic rank and coupled to said sub-encoding means to receive said output signals and said output counts, and constructed to produce at least one secondary output signal and at least one group of secondary output counts which indicate whether all or most of said output signals of said sub-encoding means are of the same value and, if not, which of said sub-encoding means is the sub-encoding means that has the next most-significant bits coupled to it that differs from said most-significant sign bit.

6. A scaler for the justification of binary numbers having an excess number of sign bits as claimed in claim 5 wherein said subsidiary sub-encoding means are partitioned into a plurality of subsidiary encoding means, and each of said subsidiary encoding means of said plurality each receives an equal number of successive output signals from said sub-encoding means, and all of said output signals of said sub-encoding means are supplied to said subsidiary encoding means, further comprising a third-rank sub-encoding means coupled to receive an output signal from all of said subsidiary encoding means constructed to provide an output signal that indicates whether or not all of the output signals from said subsidiary encoding means are of the same value, and, if not, to provide an output count which represents the next most-significant output signal that differs from the most-significant output signal supplied to said third-rank sub-encoding means.

7. A scaler for the justification of binary numbers having an excess number of sign bits as claimed in claim 6 further comprising correction factor means coupled to said encoding means for providing a correction factor count required to connect a justified number from one numbering system to another.

8. A scaler for the justification of binary numbers having an excess number of sign bits as claimed in claim 7 wherein said least-significant bit of said binary number that is supplied to each sub-encoding means, except for the least-significant bit of said binary number, is also supplied as the most-significant bit to another sub-encoding means, and said correction factor means comprises octal sense correction means coupled to receive said output counts of said plurality of sub-encoding means.

* * * * *